US009569433B1

(12) United States Patent
Gill et al.

(10) Patent No.: US 9,569,433 B1
(45) Date of Patent: Feb. 14, 2017

(54) MOBILE APPLICATION ANALYTICS

(71) Applicant: Amazon Technologies, Inc., Reno, NV (US)

(72) Inventors: Sunbir Gill, Irvine, CA (US); Rahul Ravikumar, Irvine, CA (US); Geoffrey Scott Pare, Seattle, WA (US); Kenny Nha Lam, Alhambra, CA (US); Matthew A. Jones, Ladera Ranch, CA (US)

(73) Assignee: Amazon Technologies, Inc., Seattle, WA (US)

(*) Notice: Subject to any disclaimer, the term of this patent is extended or adjusted under 35 U.S.C. 154(b) by 966 days.

(21) Appl. No.: 13/870,223

(22) Filed: Apr. 25, 2013

(51) Int. Cl.
G06F 11/34 (2006.01)
G06F 17/30 (2006.01)

(52) U.S. Cl.
CPC ........... *G06F 17/30* (2013.01); *G06F 11/34* (2013.01); *G06F 11/3409* (2013.01)

(58) Field of Classification Search
CPC combination set(s) only.
See application file for complete search history.

(56) References Cited

U.S. PATENT DOCUMENTS

2012/0036498 A1* 2/2012 Akirekadu .......... G06F 11/3495
717/124
2013/0312059 A1* 11/2013 Otsuki ................... H04H 60/13
726/1

* cited by examiner

*Primary Examiner* — Huan Tran
(74) *Attorney, Agent, or Firm* — Thomas Horstemeyer, LLP

(57) ABSTRACT

Disclosed are various embodiments for taking measurements associated with the execution of an application on one or more client devices. A measurement policy and/or a transmission policy may be defined by a developer with associated with an application. The measurement policy and/or transmission policy may be used by the one or more client devices in taking measurements, aggregating measurements into measurement collections, and/or transmitting measurements. The measurements may be used in the derivation of statistical information.

23 Claims, 12 Drawing Sheets

```
{"collection":
  {"clientName":
    {"AccessId": "LJKLWIEU281739FJ",
     "SecretKey": "UndFDfjk12983JdjafdiZOI/jfdaiu9",
     "SessionToken": "FKDLJ546510FLKJFDF",
     "localStorageEncryptionKey": "jFDDF81jfadfi1293",
     "localStorageEncryptionScheme": "AES",
     "localStorageMaxRollover": 5,
     "localStoragePersistenceType": "PrivateData",
     "localStorageRolloverFilesize": 150000,
     "policies":
      [
        {"period": 0,
         "restrictions":
          {"metadataPatterns":
            {"packageName": "com\\.developer\\.DevelopSoft\\
.MobileApplication"}
          }
        },
        {"excludedNetworks":
          ["mobile"],
         "period": 14400000},
        {"period": 300000}
      ],
     "Bucket": "application-measurements",
     "DateFormatKey": "yyyy-MM-dd-HH-mm-ss-'clientName-7bb2dffb-
6118-472d-82ff-391d2bc97aed.gz'",
     "QueueName": "application-measurement-queue"},
  },
  "state":
    {"expiry": 86400000,
     "nextRefresh": 120000,
     "retryInterval": 60000,
     "serverTime": 1341289818.795,
     "submissionInterval": 600000, }
}
              ↖
              606
```

FIG. 6B

MOBILE APPLICATION ANALYTICS

BACKGROUND

With the emergence of mobile technology, a multitude of devices exist with varying capabilities. Thus, an application executing on a particular device may function differently with respect to the same application executing on other devices. Although users of the devices may volunteer improper and/or proper execution of the application on their respective device, it remains difficult for developers to ascertain information associated with the proper and/or improper execution of applications on the multitude of mobile devices.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 6B is a drawing of data structure comprising data associated with measurements obtained in the networked environment of FIG. 2 according to various embodiments of the present disclosure.

DETAILED DESCRIPTION

The present disclosure relates to obtaining measurements associated with the execution of one or more applications in one or more client devices. With the emergence of mobile technology, a multitude of devices exist with varying capabilities. Devices may comprise, for example, cellular phones, smartphones, tablets, laptop computers, and/or various other types of computing devices. Moreover, different models of devices are manufactured and sold under one or more brands. With the range of devices existing with different hardware and/or software capabilities, an application developed by a developer executing on a particular device may function differently with respect to the same application executing on other devices.

Typically, the only feedback provided to a developer is upon a "crash" of an application, wherein the application failed to execute on the device as intended. The crash reports provided to the developer may not be descriptive enough to facilitate a repair of the application. Although users of the devices may volunteer a submission of reports comprising information related to an improper and/or proper execution of the application on their respective device, it remains difficult for developers to ascertain information associated with the proper and/or improper execution of applications on the multitude of mobile devices.

Accordingly, taking measurements associated with the execution of an application on one or more devices may facilitate and/or improve the performance of applications on the one or more devices by providing developers with information associated with the performance of their applications on various devices. An Application Development Kit (ADK) may be used by developers that facilitate taking measurements associated with the execution of one or more applications on one or more devices. In the following discussion, a general description of a system for taking measurements and its components are provided, followed by a discussion of the operation of the same.

Figure 1:
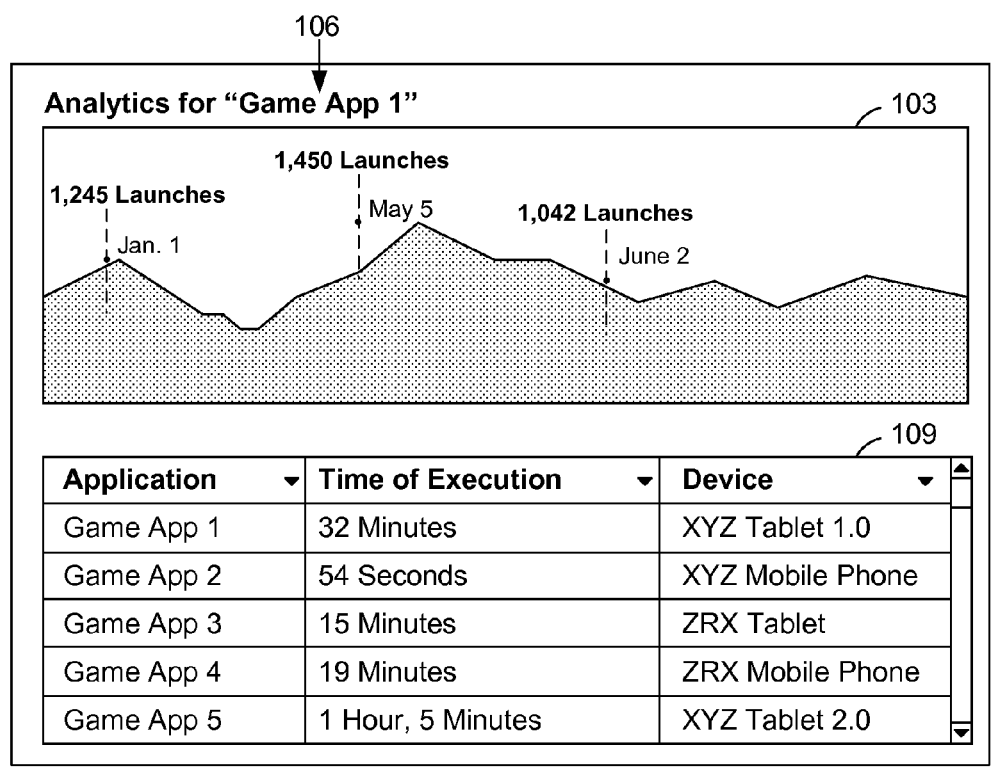
FIG. 1 is a drawing of a graph comprising statistical information derived for measurements obtained from a client device according to various embodiments of the present disclosure.

With reference to FIG. 1, shown is a graph 103 that may be generated based on statistics derived from the measurements collected on one or more client devices. The measurements may be collected by measuring the performance of one or more applications executing on the one or more client devices. For example, the graph 103 may comprise information pertaining to the number of launches (i.e., executions) for a particular application 106 (e.g., "Game App 1") in relation to one or more dates.

Similarly, a table 109 may comprise statistics and/or other information associated to one or more applications a developer might have available for purchase and/or download in an electronic commerce system. For example, a time of execution may be shown for particular application running on a particular device. The measurements may be collected and/or transmitted according to one or more measurement policies and/or transmission policies, as will be described in greater detail below.

Figure 2:
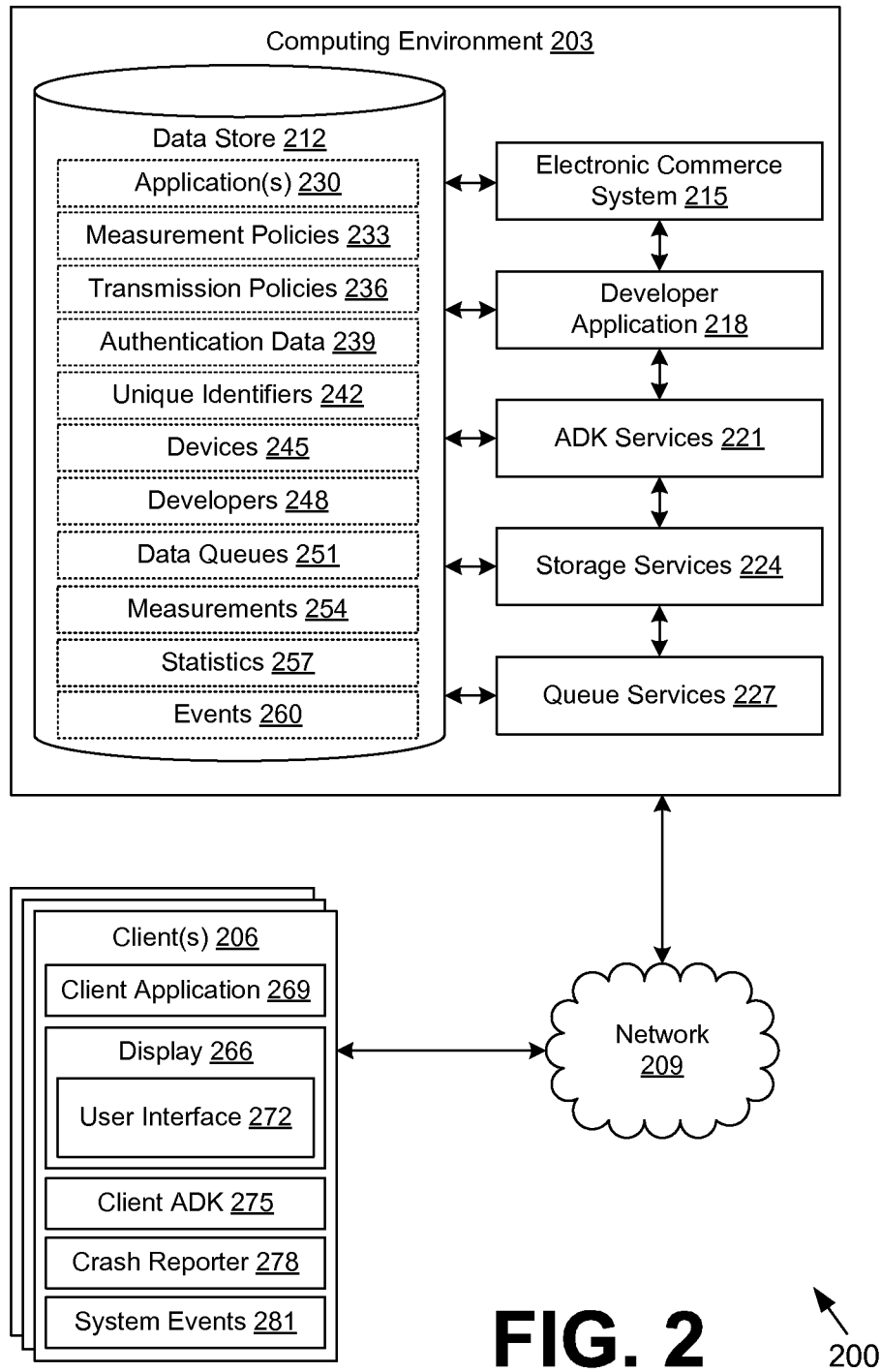
FIG. 2 is a drawing of a networked environment according to various embodiments of the present disclosure.

With reference to FIG. 2, shown is a networked environment 200 according to various embodiments. The networked environment 200 includes a computing environment 203 and a client device 206, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that may be employed, and that are arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below. The components executed on the computing environment 203, for example, include an electronic commerce system 215, a developer application 218, ADK services 221, storage services 224, queue services 227, and other applications, services, processes, systems, engines, or functionality not discussed in detail herein.

In various embodiments, the components executed on the computing environment 203 may communicate with one or more client devices 206 via an application programming interface (API) that may be implemented by one or more web services. A web service may comprise, for example, one or more software systems that facilitate an interaction among servers, computing environments 203, client devices 206, and/or any other devices. As a non-limiting example, a web service may comprise one or more APIs accessed over a network 209 via a protocol such as hypertext transfer protocol (HTTP).

To this end, a device may make programmatic service calls (e.g., API calls) to communicate with or otherwise access the components executed on the computing environment 203 by way of protocols and formats such as representational state transfer (REST), simple object access protocol (SOAP), web services description language (WSDL), web application description language (WADL), extensible hypertext markup language (XHTML), extensible markup language (XML), Rich Site Summary (RSS), JavaScript Object Notation (JSON), atom publishing Protocol (ATOM), and/or other protocols and formats. In various embodiments, the components of the computing environment 203 may be offered to third parties, for example, as a platform as a service and/or infrastructure as a service in response to a subscription associated with the third party.

The electronic commerce system 215 is executed in order to facilitate the online purchase of applications over the network 209. The electronic commerce system 215 also performs various backend functions associated with the online presence of a developer in order to facilitate the online purchase and/or download of applications as will be described. For example, the electronic commerce system 215 generates network pages such as web pages or other types of network content that are provided for the purposes of selecting applications for purchase, rental, download, lease, or other form of consumption as will be described.

The developer application 218 is executed to provide one or more user interfaces to developers, as an authorized user, in order to facilitate receipt of measurement policies and/or transmission policies. Furthermore, the developer application 218 is executed to provide measurements and/or statistics derived from the measurements to the developers. For example, the developer application 218 may render one or more user interfaces comprising a request for a measurement policy and/or a transmission policy and transmit the request to a device authenticated as the developer.

The ADK services 221 are executed to transmit measurement policies and/or transmission policies to one or more client devices 206. The ADK services 221 may access the measurement policies and/or the transmission policies previously provided by a developer of an application to the client devices 206 that have previously downloaded the application. Moreover, the ADK services 221 are executed to receive measurements and/or measurement collections transmitted by the client device 206 to the computing environment 203. The functionality of the ADK services 221 may be accessed by one or more devices via an API implemented by one or more web services. To this end, the ADK services 221 may be accessed via one or more programmatic service calls (e.g., API calls).

The storage services 224 are executed to store the measurement policies and/or the transmission policies provided by a developer via the developer application 218, for example, in data store 212. Similarly, the storage services 224 are executed to store the measurements and/or the measurement collections, for example, in data store 212.

In one embodiment, a network storage environment is employed in the storage of data. In this embodiment, the data stored by the storage services 224 are stored in a network environment comprising one or more data "buckets" and the data may be retrieved from the buckets via keys unique to the one or more developers. A developer may predefine a set of one or more geographic or logically distinct locations of the buckets to be used in the storage of the data. For example, a developer may request that buckets be used in the storage of measurements in a set of availability zones in Singaporean and United States data centers for applications being executed in Singapore or other locations.

The queue services 227 are executed to receive and place data in one or more queues to await processing by the ADK services 221. The queue services 227 may prevent access to the one or more queues and/or the data in the one or more queues from other requesting devices and/or services until the data has been processed.

The data stored in the data store 212 includes data associated with, for example, applications 230, measurement policies 233, transmission policies 236, authentication data 239, unique identifiers 242, devices 245, developers 248, data queues 251, measurements 254, statistics 257, events 260, and potentially other data. Applications 230 may comprise, for example, applications 230 available for consumption via the electronic commerce system 215 and/or capable of execution on one or more client devices 206. For example, applications 230 may comprise "mobile applications" capable of being executed on smartphones, tablets, and/or personal computers.

Measurement policies 233 may comprise, for example, definitions of measurements 254 to be measured on one or more client devices 206. Moreover, measurement policies 233 may comprise a configuration that may be used to configure one or more client devices 206 upon receipt of a measurement policy 233. For example, a measurement policy 233 may define that measurements 254 are to be conducted corresponding to the execution of a third-party application 230 owned and/or maintained by a third-party developer. Upon receipt of the measurement policy 233, a client device 206 may be configured to collect measurements 254 defined in the measurement policy 233. As may be appreciated, measurements 254 will be measured in the client device 206 according to the one or more measurement policies 233 defined, for example, by a developer of the application 230. Moreover, measurement policies 233 may comprise, for example, how measurements 254 are to be stored locally on a client device 206.

Similarly, transmission policies 236 may comprise, for example, a set of one or more definitions and or rules that cause an application executing on a client device 206 to provide an indication on how transmissions are to be conducted by the client device 206. For example, a transmission policy 236 may define that measurements 254 are to be aggregated into measurement collections prior to transmission of the measurements 254 and/or measurement collections. The transmission policy 236 may state that transmissions of measurements 254 are to occur in the client device 206 at predefined times. In an alternative embodiment, the transmission policy 236 may state that transmissions of measurements 254 are to occur in the client device 206 upon the occurrence of an event, as will be discusses in greater detail below.

Authentication data 239 may comprise, for example, usernames, password, biometric data, and/or any other information that may be used in the authentication of users, developers, devices, and/or services in the system. For example, in accessing the developer application 218, a developer may be required to be authenticated by requiring the developer to provide a username and/or password. Similarly, unique identifiers 242 may comprise, for example, tokens unique to one or more client devices 206, accounts, users, and/or developers that may be used in identification and/or authentication. For example, a client device 206 may communicate with the one or more services upon authentication of one more tokens identifying and/or authenticating the client device 206.

Devices 245 may comprise information associated with one or more client devices 206. For example, devices 245 may comprise information associated with the manufacturers, models, hardware capabilities, software capabilities, operating systems, performance metrics, and/or other information associated with one or more devices.

Developers 248 may comprise information associated with one or more developers of applications 230 offered for consumption on the electronic commerce system 215 and/or capable of execution on or more client device 206. For example, certain developers 248 may be associated with certain applications 230 to identify a developer 248 of the application 230.

Data queues 251 may comprise, for example, queues of data that may be used by the queue services 227. For example, measurements 254 and/or measurement collections collected on a client device 206 may be placed in the one or more queue services 227 to await processing by the ADK services 221.

Measurements 254 may comprise, for example, information collected from one or more client devices 206. The measurements 254 may be collected in association with the performance of one or more applications 230 on the one or more client devices 206. Measurements 254 may further comprise, for example, an operating system on which the application 230 is executed, the occurrence of system events on the client device 206, a duration of execution, a time of execution, a flow model representing the execution of the application 230, portions of the application 230 engaged by the user (e.g., which part of the screen a user touched on a touch screen smartphone), whether the application 230 properly executed, whether the application 230 was improperly executed (e.g., whether the application 230 "crashed" on a device), a lead of interactions and events conducted prior to a crash, the peripheral devices that are executing and the types of information received from peripheral devices, the permissions of the application 230, etc. The measurements 254 may be compiled into statistics 257 associated with one or more application 230, one or more client devices 206, and/or one or more developers 248. Thus, statistics 257 may comprise derived analytics associated with measurements 254.

Events 260 may comprise, for example, events that may be predefined by a developer. Events 260 may be initiated and/or triggered upon the identification of a particular measurement 254. Similarly, events 260 may be initiated upon the identification of measurements 254 meeting and/or exceeding a predefined threshold.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 206 may include a display 266. The display 266 may comprise, for example, one or more devices such as liquid crystal display (LCD) displays, gas plasma-based flat panel displays, organic light emitting diode (OLED) displays, LCD projectors, or other types of display devices, etc.

The client 206 may be configured to execute various applications 230 such as a client application 269. The client application 269 may be executed in a client 206, for example, to access network content served up by the computing environment 203 and/or other servers, thereby rendering a user interface 272 on the display 266. To this end, the client application 269 may comprise, for example, a browser, a dedicated application such as applications 230 available for download from data store 212, etc., and the user interface 272 may comprise a network page, an application screen, etc. The client 206 may be configured to execute applications beyond the client application 269 such as, for example, email applications, social networking applications, word processors, spreadsheets, and/or other applications.

Moreover, the client 206 may comprise, for example, a client ADK 275, a crash reporter 278, and/or system events 281. A client ADK 275 may comprise, for example, applications 230, libraries, development kits, and/or portions of applications 230 that may be configured to take measurements 254 based at least in part on measurement policies 233. The client ADK 275 may be further configured to aggregate measurements 254 into measurement collections. The client ADK 275 may communicate with the network through the client device 206 and/or may transmit measurements 254 and/or measurement collections to the computing environment 203. The crash reporter 278 may be configured to identify improper executions of applications 230. The crash report 278 may identify causes of the improper executions which may be accounted for as measurements 254 taken by the client ADK 275. System events 281 may be monitored and important and/or identifiable events may be measured as measurements 254. Moreover, system events 281 may trigger an initiation of an action in response to the system event 281. For example, a system event 281 may indicate that the client device 206 has access to the network 209. Upon the indication of the system event 281, a transmission of measurements 254 and/or measurement collections may be initiated.

Next, a general description of the operation of the various components of the networked environment 200 is provided. As may be appreciated, a developer may have access to a developer application 218, ADK services 218, and/or a client ADK 275. For example, access may be granted to the applications, services, and/or libraries based at least in part on a subscription. The developer may desire to take measurements 254 associated with the execution of an application 230 maintained by the developer.

To begin, a client ADK 275 on a client device 206 may be configured to run as a background process, wherein the client ADK 275 does not interfere with the performance of the client device 206 and/or the performance of client applications 269 executing on the client device 206. Alternatively, the client ADK 275 may be a portion of the client application 269 (e.g., a library), wherein the client ADK 275 does not interfere with the execution of the client application 269. A measurement policy 233 and/or a transmission policy 236 may be received by the client ADK 275 from the ADK services 221. For example, a developer of an application 230 may have predefined a measurement policy 233 and/or a transmission policy 236 via a developer application 221 or via a similar component. A measurement policy 233 may comprise, for example, precise measurements 254 to be collected by the client ADK 275. A transmission policy 236 may comprise, for example, statements that the measurements 254 are to be batched and transmitted at a predefined time or upon the occurrence of predefined system event 281 (e.g., upon a client device 206 having access to a high-speed network).

The measurements 254 collected by the client ADK 275 may be aggregated into a measurement collection if designated to do so in the transmission policy 236. For example, a transmission policy 236 may state that measurements 254 are to be batched prior to transmission in order to minimize processing time, battery consumption, transmission time, etc. Moreover, the client ADK 275 may be configured to encrypt the measurements 254 and/or measurement collections according to one or more encryption schemes if defined to do so by the transmission policy 236.

The measurements 254 and/or the measurement collection are transmitted from the client device 206 to the one or more computing environments 203 according to the transmission policy 236. In one embodiment, all of the measurements 254 and/or the measurement collections may be transmitted to one computing environment 203. In an alternative embodiment, the measurements 254 and/or the measurement collections may be transmitted in a distributed computing configuration. Accordingly, the measurements 254 and/or the measurement collections may be transmitted to components executing in various computing environments 203. For example, the measurements 254 and/or measurement collections may be transmitted from the client device 206 to storage services 224 executing in a first computing environment 203, to queue services 227 executing in a second computing environment 203, and/or to ADK services 221 executing in a third computing environment 203.

The transmission policy 236 may state that transmissions of measurements 254 are to occur in the client device 206 at predefined times or periodically. In an alternative embodiment, the transmission policy 236 may state that transmissions of measurements 254 are to occur in the client device 206 upon the occurrence of a system event 281. A system event 281 may comprise, for example, a client device 206 obtaining access to a high-speed network connection (e.g., Wi-Fi, 4G, 3G connectivity, etc.).

Upon receipt of the measurements 254 and/or the measurement collections the measurements 254 and/or the measurement collections may be stored in data store 212 by the storage services 224. The ADK services 221 may access the measurements 254 and/or the measurement collections directly from the data store 212 and/or by communicating with the storage services 224. Similarly, a queue service 227 may be used in the processing of measurements 254 and/or measurement collections. For example, the measurements 254 and/or the measurement collections may be placed in one or more queues via the queue services 227 to await processing by the ADK services 221.

The ADK services 221 may process the measurements 254 and/or the measurement collections to generate statistics 257 in association with the measurements 254 and/or the measurement collections. The statistics 257, the measurements 254, and/or the measurement collections may be encoded in one or more user interfaces 272 to be rendered in a display. For example, one or more user interfaces, may be employed facilitating the viewing and/or manipulation of the generated statistics 257.

Figure 3:
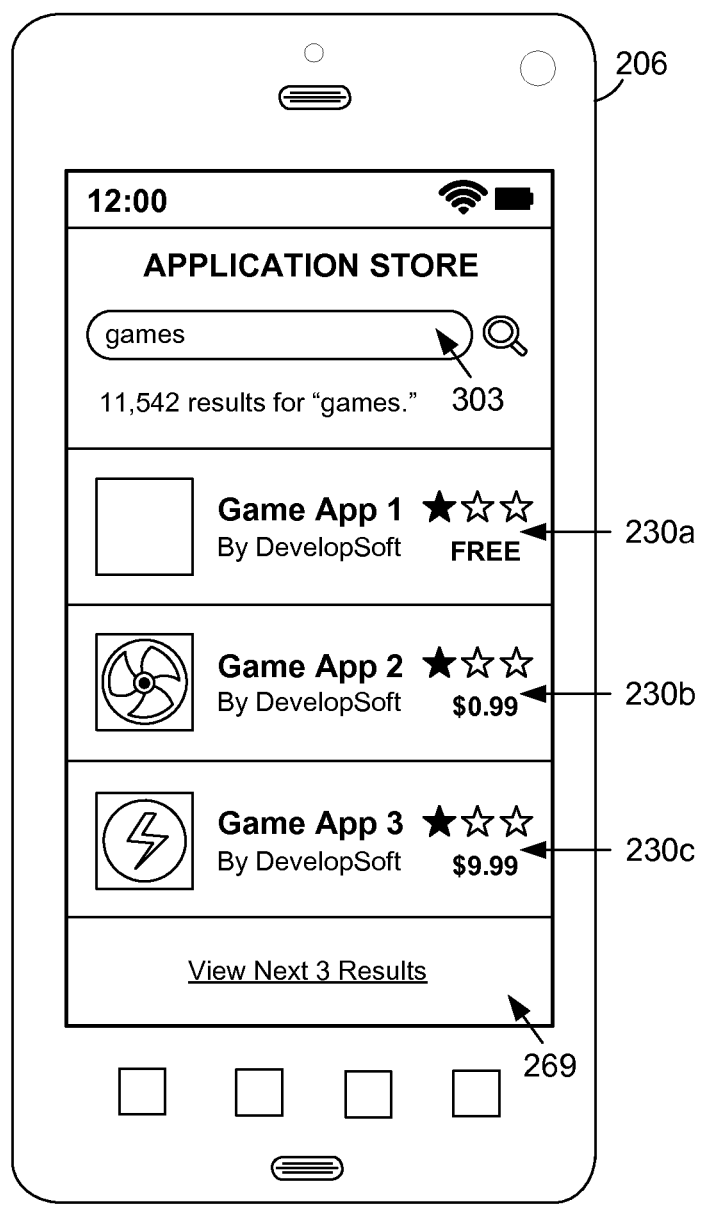
FIG. 3 is a drawing of an example client device executing a client application in the networked environment of FIG. 2 according to various embodiments of the present disclosure.

Referring next to FIG. 3, shown is a client device 206 comprising a cellular telephone executing a client application 269 in communication with an electronic commerce system 215 to facilitate the consumption of one or more applications 230a, 230b, and 230c. As discussed above with respect to FIG. 2, an electronic commerce system 215 may be employed to facilitate the sale, purchase, and/or lease of software applications capable of being executed on client devices 206. As may be appreciated, a developer may upload one or more software applications to the electronic commerce system 215; thereby permitting users of the electronic commerce system 215 to purchase, lease, and/or download the developer's applications 230. By doing so, a user of the client device 206 may access and/or execute the application 230 provided by the developer on one or more clients 206 associated with the user.

As shown in the example embodiment of FIG. 3, a client application 269 in communication with an electronic commerce system 215 may sale or offer for sale a variety of software applications. Some or all of the software applications available for purchase may be limited to the particular device running the client application 269. A series of additional user interfaces 272 (not shown) may be rendered to facilitate the purchase, download, and/or execution of one or more applications 230 on the respective client device 206.

Although the embodiment of FIG. 3 depicts a client device 206 as a mobile phone, a client device 206 may comprise a desktop computer, a laptop computer, personal digital assistants, other cellular telephones, smartphones, set-top boxes, music players, web pads, tablet computer systems, game consoles, electronic book readers, or other devices with like capability.

Figure 4:
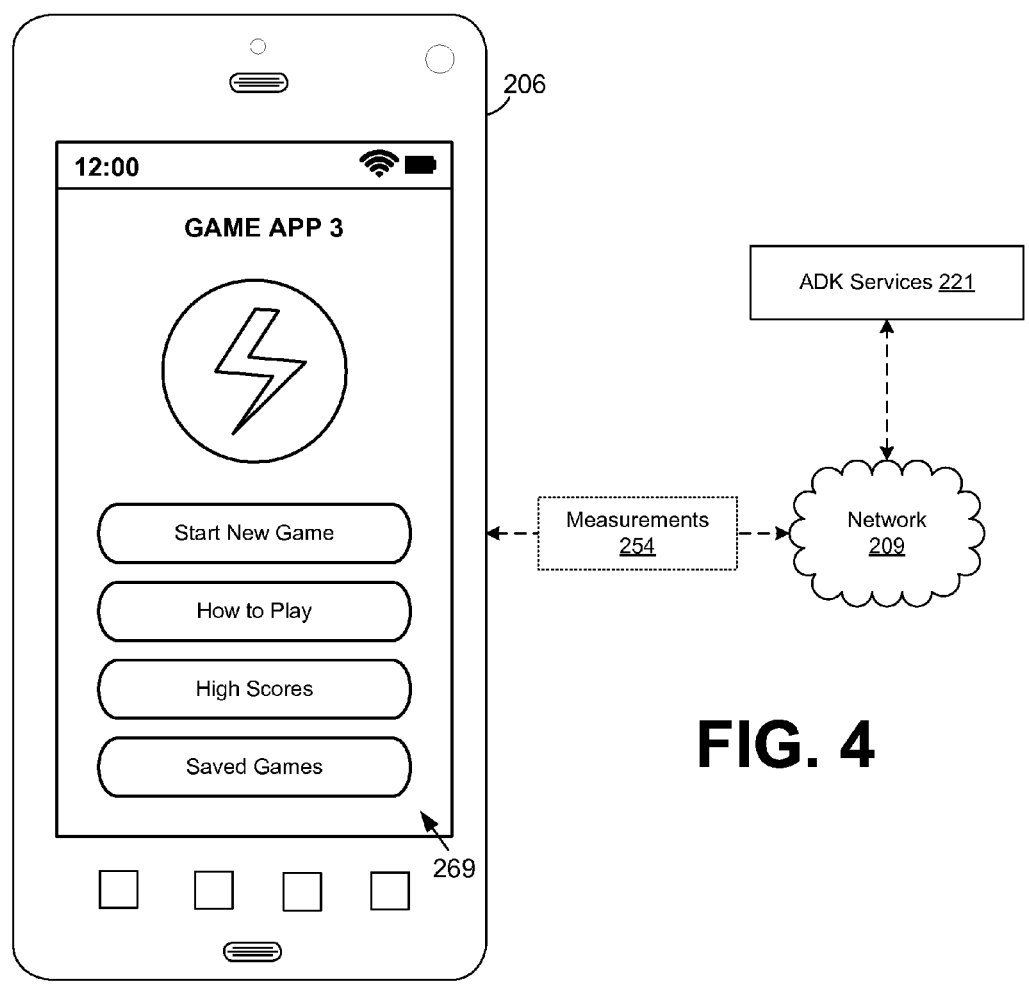
FIG. 4 is a drawing of an example client device transmitting measurements in the networked environment of FIG. 2 according to various embodiments of the present disclosure.

Turning now to FIG. 4, shown is a client device 206 comprising a cellular telephone executing a client application 269. The client application 269 may have been obtained via an electronic commerce system 215 (FIG. 2) or from another source. As discussed above with respect to FIG. 2, a client ADK 275 (FIG. 2) may execute on a client 206 while not interfering with the execution of other client applications 269. The client ADK 275 may collect measurements related to the execution of a client application 269 according to a measurement policy 233 (FIG. 2) defined by a developer of the client application 269 and stored locally on the client device 206. Subsequently, the measurements 254 collected by the client ADK 275 may be transmitted to one or more components over a network 209 according to one or more transmission policies 236 also defined by the developer. In the non-limiting example of FIG. 4, the measurements 254 collected by the client ADK 275 may be transmitted by the client device 206 to the ADK services 221 executing, for example, in a computing environment 203 (FIG. 2).

Figure 5A:
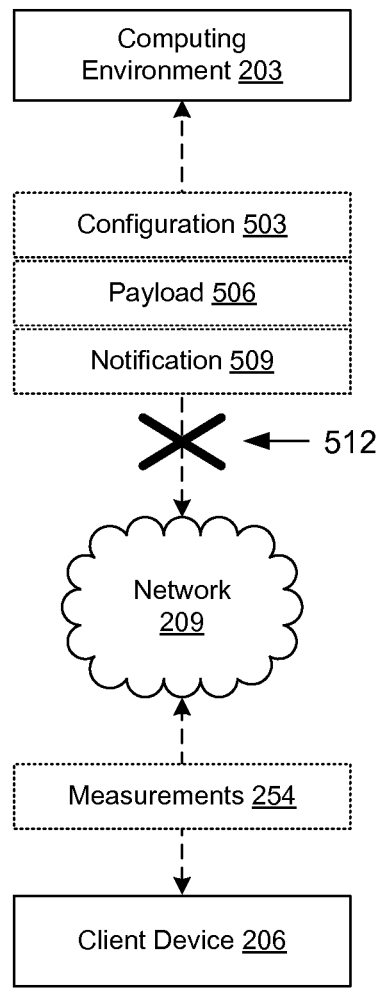
FIG. 5A is a drawing of a diagram illustrating a client-server arrangement that may be employed in the networked environment of FIG. 2 according to various embodiments of the presented disclosure.

Moving on to FIG. 5A, shown is a diagram illustrating a traditional client-server arrangement that may be employed. For example, a client 206 may transmit measurements 254 collected by the client ADK 275 (FIG. 2) to the computing environment 203 over network 209. As may be appreciated, a configuration 503, a payload 506, and/or notifications 509 are transmitted over the network. If an interruption, illustrated by component 512, occurs none of the measurements 254 may reach the computing environment 203.

Figure 5B:
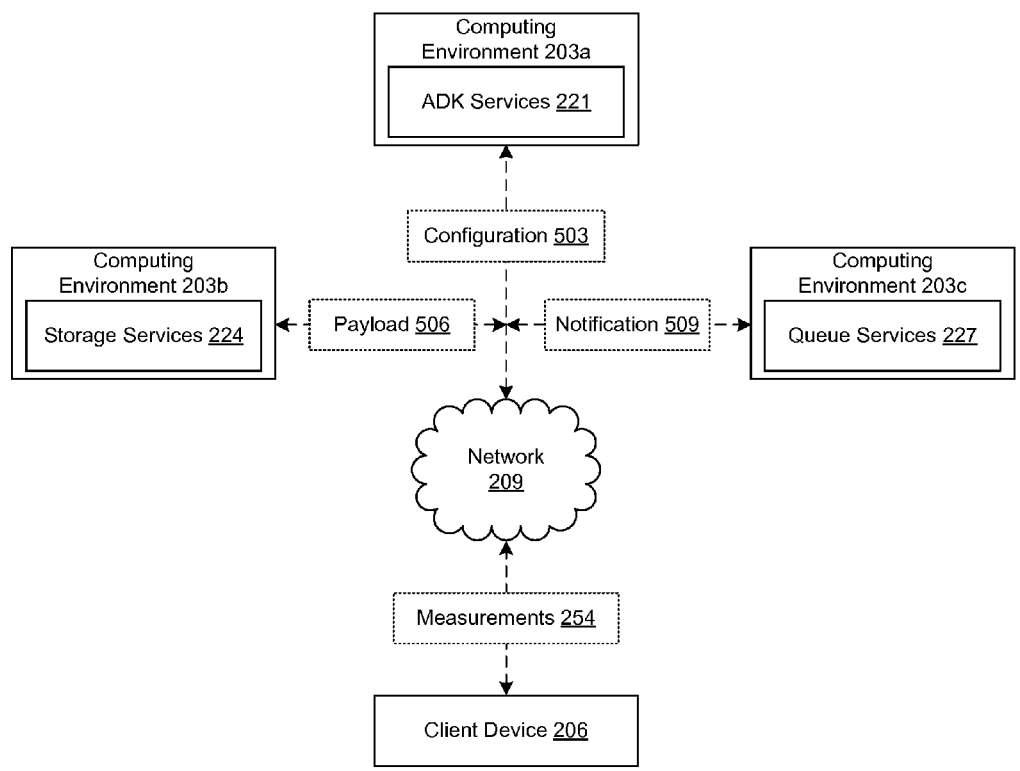
FIG. 5B is a drawing of a diagram illustrating an alternative client-server arrangement that may be employed in the networked environment of FIG. 2 according to various embodiments of the presented disclosure.

Referring next to FIG. 5B, shown is an alternative embodiment for a client-server arrangement that may be employed in the transmission of measurements 254 to one or more computing environments 203 (FIG. 2) from one or more client devices 206. In the non-limiting example of FIG. 5B, a distributed computing arrangement may be employed comprising of computing environments 203a, 203b, and/or 203c. The components executed in the computing environments 203 may be distributed among the computing environments 203, for example, at distinct geographic locations. Accordingly, the measurements 254 collected in client device 206 may be transmitted among ADK services 221 executing in computing environment 203a, storage services 224 executing in computing environment 203b, and/or queue services 227 executing in computing environment 203c. In the event an interruption were to occur interrupting communication with one of the computing environment 203s, it is likely the measurements 254 transmitted by the client device 206 would be received by the other computing environments 203.

Figure 6A:
FIG. 6A is a drawing of data structure comprising data associated with measurements obtained in the networked environment of FIG. 2 according to various embodiments of the present disclosure.

Turning now to FIG. 6A, shown is an example data structure 603 comprising data associated with one or more measurements 254 collected by the client ADK 275 on a client device 206. In the non-limiting example of FIG. 6A, a data structure 603 may comprise a JavaScript Object Notation (JSON) data structure that may be received and/or parsed by the computing environment 203 to obtain the measurements 254 residing in the data structure. Transmitting measurements 254 as JSON data structures may have the additional benefit of being human-readable and/or language-independent, as may be appreciated.

Although embodied as a JSON data structure in FIG. 6A, it is understood that other technologies may be employed in communicating measurements 254 from the client device 206 to the one or more computing environments 203. For example, Extensible Markup Language (XML), Rich Site Summary (RSS), Atom Publishing Protocol (ATOM), Simple Object Access Protocol (SOAP), Representational State Transfer (REST), and/or Extensible Hypertext Markup Language (XHTML) may be used in the communication of measurements 254 from a client device 206 to one or more computing environments 203.

Moving on to FIG. 6B, shown is an example data structure 606 comprising data associated with a measurement policy 233 and/or a transmission policy 236 that may be defined by a user and transmitted by a computing environment 203 to the client ADK 275 on a client device 206. In the non-limiting example of FIG. 6B, a data structure 606 may comprise a JSON data structure generated by the ADK services 221 based on definitions made by a user of the developer application 230. Accordingly, a data structure 606 may be encoded capable of communication with the client ADK 275 executing on a client device 206. As may be appreciated, transmitting measurement policies 233 and/or transmission policies 236 as JSON data structures may have the additional benefit of being human-readable and/or language-independent.

Upon receipt of a measurement policy 233 and/or a transmission policy 236, the client ADK 275 may collect measurements 254 from predefined applications 230 according to the received measurement policy 233. The measurements 254 collected by the client ADK 275 may be transmitted according to the received transmission policy 236. For example, the measurements 254 may be batched and transmitted to the computing environment 203 at a predefined time or upon an occurrence of a predefined system event 281 (e.g., upon detection of access to a high-speed network).

Although embodied as a JSON data structure in FIG. 6B, it is understood that other technologies may be employed in communicating measurement policies 233 and/or transmission policies 236 from the computing environment 203 to the one or more client devices 206. For example, XML, RSS, ATOM, SOAP, REST, and/or XHTML may be used in the communication of measurement policies 233 and/or transmission policies 236 from a computing environment 203 to one or more client devices 206.

Figure 7:
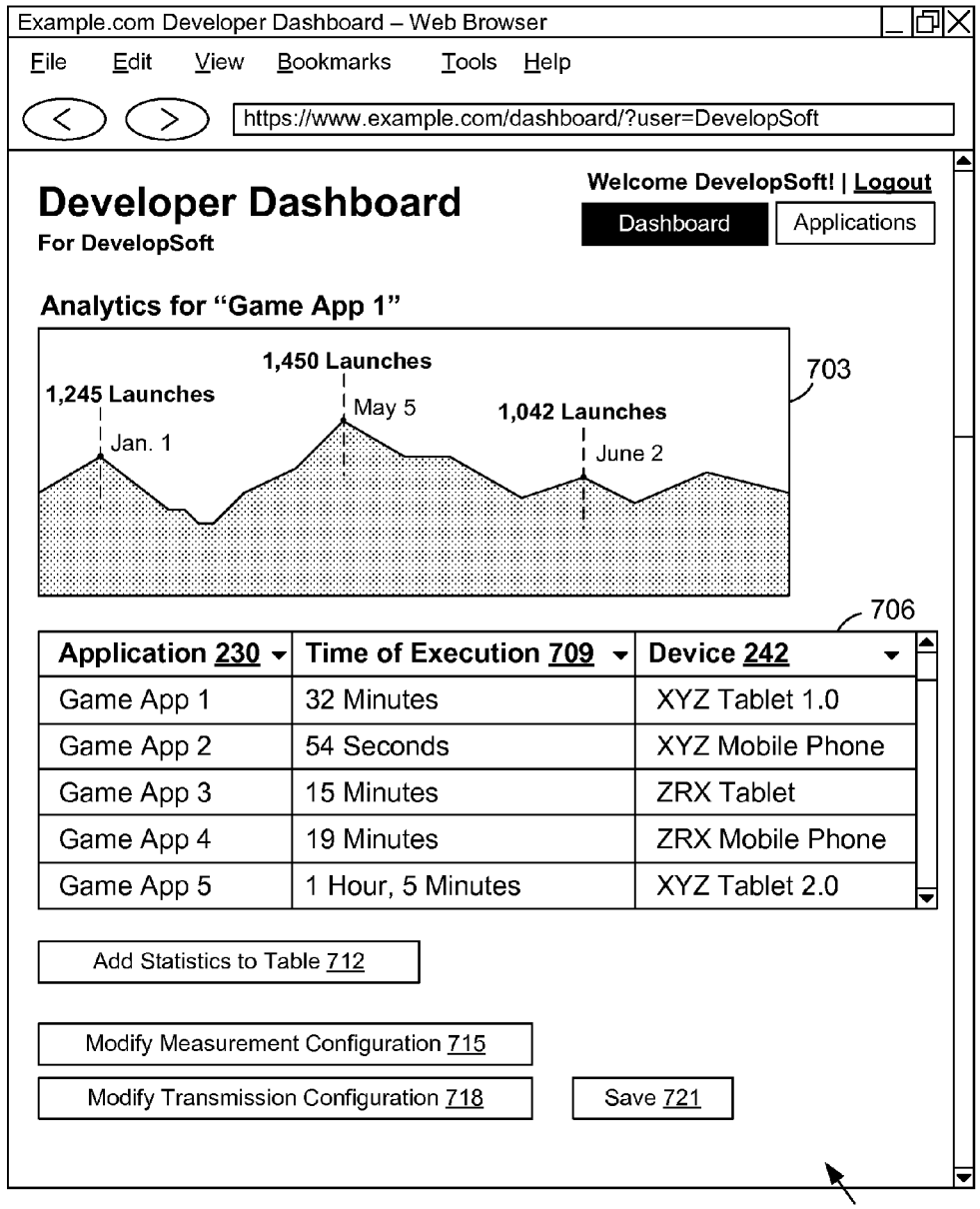
FIG. 7 is a drawing of an example of a user interface rendered by a client in the networked environment of FIG. 2 according to various embodiments of the present disclosure.

Referring next to FIG. 7, shown is an example user interface 272 that may be encoded by the developer application 218 and rendered in a display 266. In the non-limiting example of FIG. 7, shown is a "developer dashboard" that may facilitate the viewing and/or manipulation of statistics 257 generated from measurements 254 collected from one or more client devices 206. As may be appreciated, viewing of statistics 257 and/or measurements 254 may require an authenticated session, wherein a developer may be required to input authentication data 239 in order to access the developer dashboard.

The user interface 272 of FIG. 7 may comprise, for example, a graph 703 that may be generated based on the statistics 257 derived from the measurements 254 collected on one or more client devices 206. For example, a graph 703 may comprise information pertaining to the number of launches (i.e., executions) for a particular application 230 corresponding to one or more dates.

Similarly, a table 706 may comprise statistics 257 and/or other information associated to one or more applications 230 a developer might have available for purchase and/or download in an electronic commerce system 215. For example, a time of execution 709 may be shown for particular application 230 running on a particular device 245. An add statistics component 712 may be used to facilitate the modification of the user interface 272 to add various other statistics to the user interface 272. For example, by engaging the add statistics component 712 a series of additional user interfaces 272 may be presented facilitating the addition of statistics 257 and/or measurements 254 to the user interface 272.

Moreover, the user interface 272 of FIG. 7 may be used in facilitating the modification of measurement policies 233 and/or transmission configurations. For example, by engaging the modify measurement configurations component 715 a series of additional user interfaces 272 may be presented facilitating the modification of one or more measurement policies 233. Each measurement policy 233 may correspond to one or more of the application 230 controlled by the developer, or a universal measurement policy 233 may be used in associated with all the applications 230 controlled by a developer. Similarly, by engaging the modify transmission configurations component 718 a series of additional user interfaces 272 may be presented facilitating the modification of one or more transmission policies 236, wherein each transmission policy 236 may correspond to one or more of the application 230 controlled by the developer, or a universal transmission policy 236 may be used in associated with all the applications 230 controlled by a developer. A save 721 component may be engaged by the developer to save a current state of the user interface 272 although the current state of the user interface 272 may be saved automatically by the developer application 218.

Figure 8:
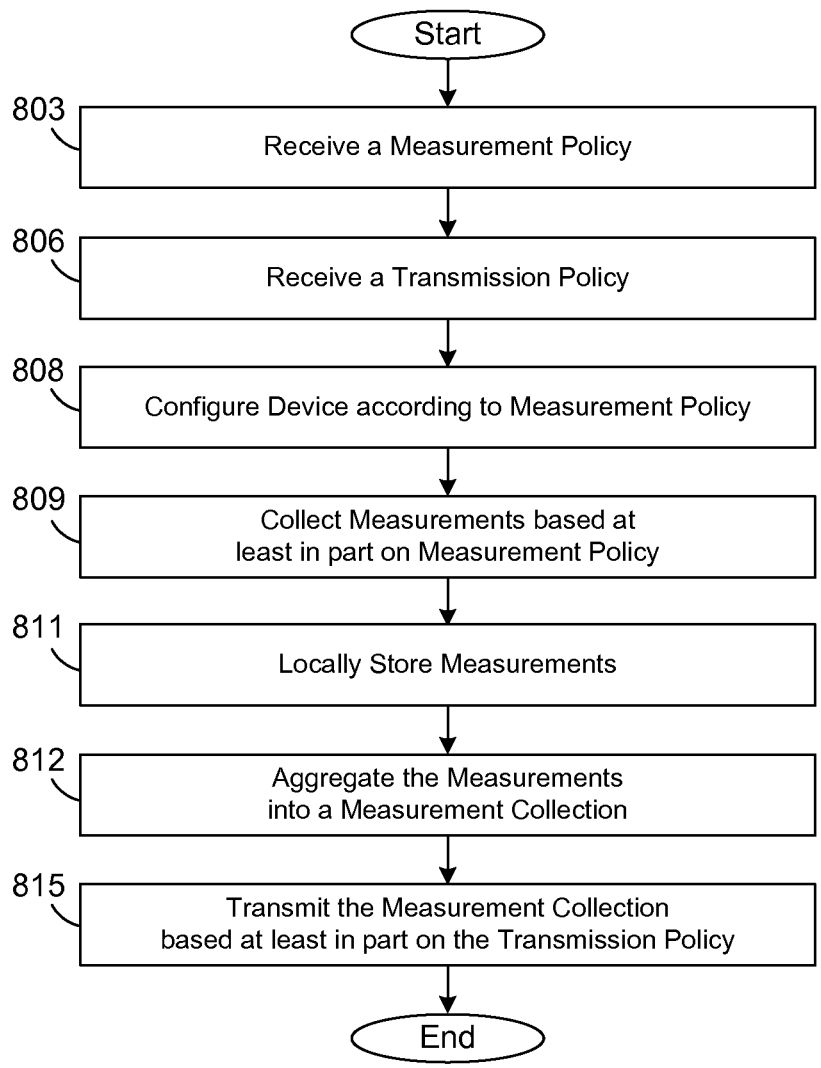
FIG. 8 is a flowchart illustrating one example of functionality implemented as portions of a client ADK executed in a computing environment in the networked environment of FIG. 2 according to various embodiments of the present disclosure.

Turning now to FIG. 8, shown is a flowchart that provides one example of the operation of a portion of the client ADK 275 according to various embodiments. It is understood that the flowchart of FIG. 8 provides merely an example of the many different types of functional arrangements that may be employed to implement the operation of the portion of the client ADK 275 as described herein. As an alternative, the flowchart of FIG. 8 may be viewed as depicting an example of steps of a method implemented in the computing environment 203 (FIG. 2) according to one or more embodiments.

As may be appreciated, a client device 206 may comprise a client ADK 275 executing on the client device 206. The client ADK 275 may be configured to run as a background process, wherein the client ADK 275 does not interfere with the performance of the client device 206 and/or the performance of client applications 269 executing on the client device 206. Alternatively, the client ADK 275 may be a portion of the client application 269, wherein the client ADK 275 does not interfere with the execution of the client application 269. Beginning with box 803, a measurement policy 233 defined by a developer via a developer interface may be received by the client ADK 275. For example, a developer of an application 230 may have predefined a measurement policy 233 via a developer application 218, a web service call, or a similar component. The measurement policy 233 may comprise, for example, precise measurements 254 to be collected by the client ADK 275 performance at predefined times or upon the occurrence of predefined system events 281.

Similarly, in box 806, the client ADK 275 receives a transmission policy 236. As a non-limiting example, a developer of an application 230 may have predefined a transmission policy 236 via a developer interface. For example, a developer interface may be a developer application 221, a web service call, or a similar component that may be employed to communicate with the components of the computing environment 203. The transmission policy 236 may comprise, for example, how the measurements 254 collected by the client ADK 275 are to be transmitted to the one or more computing environments 203. For example, a transmission policy 236 may define that the measurements 254 are to be batched and transmitted at a predefined time or upon the occurrence of predefined event (e.g., upon a client device 206 having access to a high-speed network). In various embodiments, the measurement policy 233 and the transmission policy 236 may be received by the client device 206 periodically. For example, a developer may periodically and/or dynamically update the measurement policy 233 and the transmission policy 236. Further, the developer may specify when a measurement policy 233 and/or a transmission policy 236 is to be sent from the computing environment 203 to a client device 206 according to a time or an interval predefined by the developer. By receiving the measurement policy 233 and the transmission policy 236 periodically, the client device 206 may be configured or reconfigured to collect and/or transmit measurements 254 according to an updated measurement policy 233 and/or an updated transmission policy 236.

In box 808, the measurement policy 233 may be used to configure the client device 206. In one embodiment, a client device 206 may comprise one or more configuration files in a data store in communication with the client device 206. The configuration files may be modified to instruct the client device 206, or an application executable on the client device 206, to collect measurements 254 associated with the execution of one or more applications 230. In another embodiment, a client ADK 275 on a client device 206 may be configured according to the measurement policy 233 to collect measurements 254 associated with the execution of a particular application 230 associated with the client ADK 275. For example, a client ADK 275 may comprise, libraries, development kits, and/or portions of an application 230. Accordingly, the client ADK 275 may be configured to take measurements 254 of the application 230 according to the measurement policies 233 received by the client device 206.

In box 809, the measurements 254 defined in the measurement policy 233 are collected based at least in part on the measurement policy 233. Next, in box 811, the measurements 254 collected may be stored locally on the client device 206 in memory accessible to the client device 206. In one embodiment, the measurements 254 may be stored according to definitions included in the measurement policy 233. In an alternative embodiment, a storage policy may be defined by a user, transmitted to the client device 206 from the computing environment 203, and/or used to store the measurements 254 according to the storage policy. In yet an alternative embodiment, the measurements 254 may be encrypted locally on the client device 206 prior to or after storage of the measurements 254 on the client device 206 according to one or more encryption schemes provided in the measurement policy 233.

In box 812, the measurements 254 collected by the client ADK 275 are aggregated into a measurement collection if designated to do so in the transmission policy 236. For example, a transmission policy 236 may state that measurements 254 are to be batched prior to transmission in order to minimize processing time, battery consumption, transmission time, etc. Moreover, a transmission policy 236 may request encryption of the measurements 254 according to one or more encryption schemes to be conducted in the client device 206.

In box 815, the measurement collection (or measurement 254 if not aggregated) are transmitted according to the transmission policy 236. For example, the transmission policy 236 may state that transmissions of measurements 254 are to occur at predefined times. In an alternative embodiment, the transmission policy 236 may state that transmissions of measurements 254 are to occur upon the occurrence of a system event 281. For example, the transmission policy 236 may state that a transmission is to be made when a network connection made between the computing device and a network data service provider. As a non-limiting example, a system event 281 comprises, for example, a client device 206 obtaining access to a high-speed network connection (e.g., Wi-Fi, 4G, 3G connectivity, etc.). Similarly, the transmission policy 236 may state that a transmission is to be made when a battery profile associated with a battery powering the client device 206 is at a particular state (e.g., when the battery level is above a predefined threshold).

Figure 9:
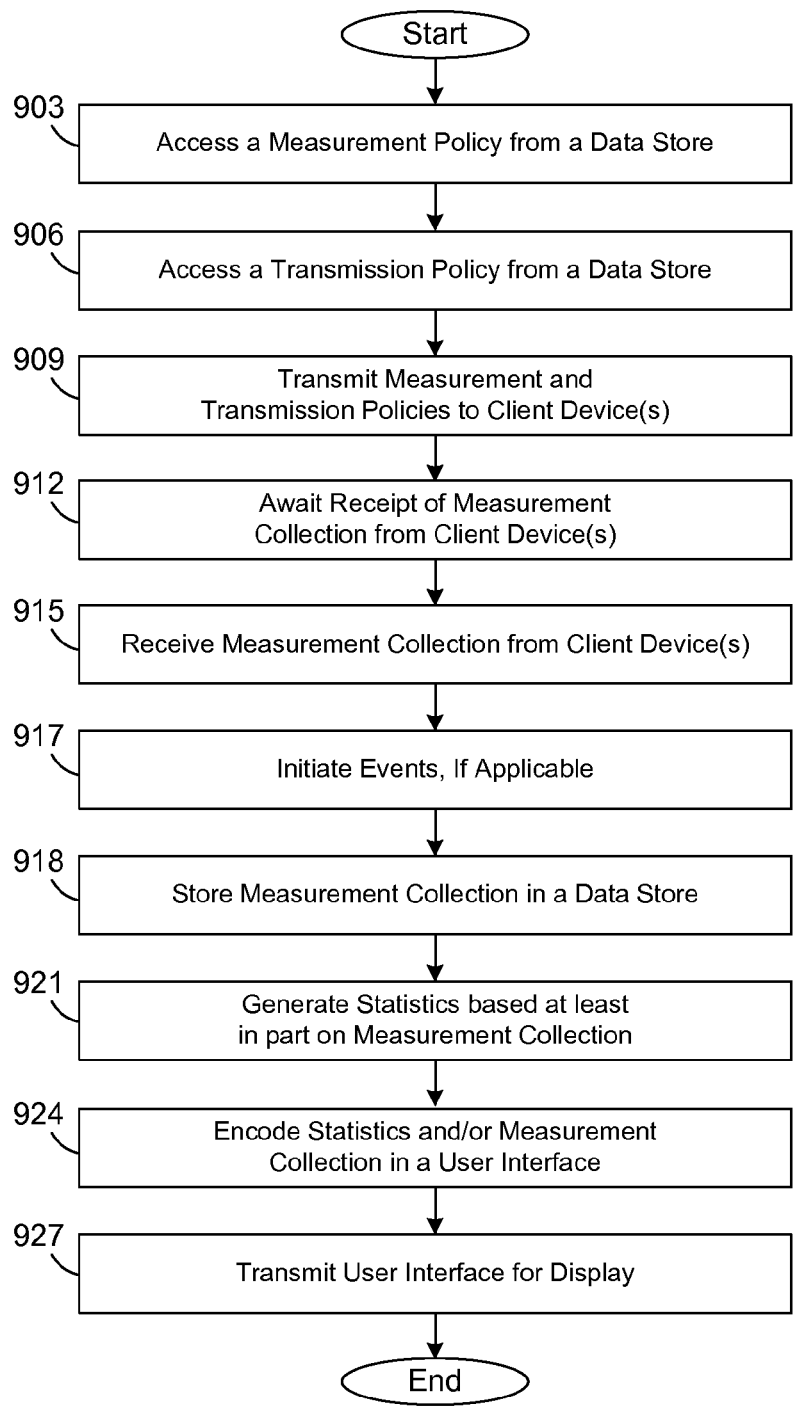
FIG. 9 is a flowchart illustrating one example of functionality implemented as portions of one or more ADK services executed in a computing environment in the networked environment of FIG. 2 according to various embodiments of the present disclosure.

Referring next to FIG. 9, shown is a flowchart that provides one example of the operation of a portion of the ADK services 221 according to various embodiments. It is understood that the flowchart of FIG. 9 provides merely an example of the many different types of functional arrangements that may be employed to implement the operation of the portion of the ADK services 221 as described herein. As an alternative, the flowchart of FIG. 9 may be viewed as depicting an example of steps of a method implemented in the computing environment 203 (FIG. 2) according to one or more embodiments.

Beginning with box 903, a measurement policy is accessed from a data store 212 (FIG. 2). Similarly, in box 906, a transmission policy may be accessed from the data store 212. As discussed above with respect to FIG. 2, a measurement policy and/or a transmission policy may have been predefined by a developer and stored in data store 212.

In box 909, the measurement policy 233 and/or the transmission policy 236 is transmitted to one or more client devices 206. As discussed above with respect to FIG. 8, a client ADK 275 may receive the measurement policy 233 and/or the transmission policy 236. Accordingly, the client ADK 275 may obtain measurements 254 during the execution of a client application 269 (FIG. 2) executing on the client device 206 according to the measurement policy 233. The client ADK 275 may aggregate and/or batch the measurements 254 into a measurement collection. Subsequently, the client ADK 275 may initiate transmission of the measurement collection according to the transmission policy 236. Thus, in box 912, the ADK service 221 executing in a computing environment 203 may await receipt of measurements 254 and/or measurement collections from a client device 206.

In box 915, the measurements 254 and/or the measurement collections may be received from the client device 206 by the ADK services 221.

Subsequently, in box 917, any events 260 associated with the measurements 254 may be initiated. For example, if the measurements 254 identify a number of application errors meeting and/or exceeding a threshold, an event 260 predefined may be initiated. An event 260 may comprise, for example, transmitting a notification to the developer of the identified measurements 254. Next, in box 918, the measurements 254 and/or the measurement collections may be stored, for example, in data store 212. In box 921, statistics may be generated in association with the measurements 254 and/or the measurement collections.

In box 924, the statistics 257, the measurements 254, and/or the measurement collections may be encoded in one or more user interfaces 272. For example, a developer dashboard, as discussed in FIG. 7, may be employed facilitating the viewing and/or manipulation of the generated statistics 257 and/or the measurements 254. In box 927, the user interface 272 may be transmitted to a device for display.

Figure 10:
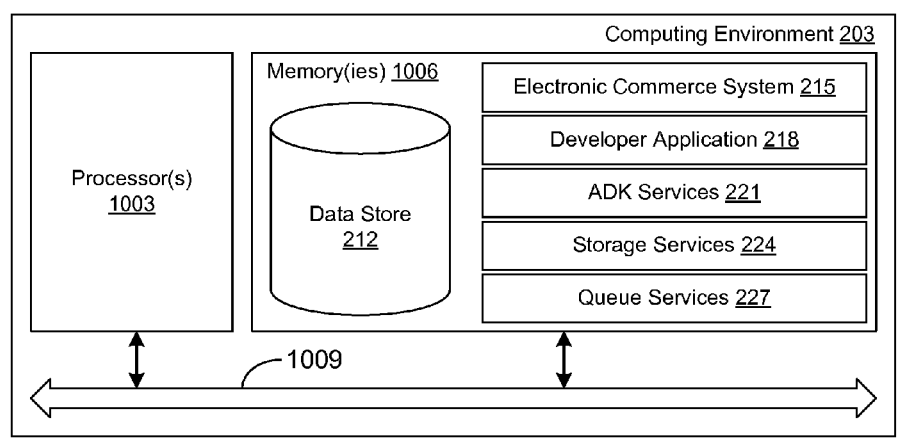
FIG. 10 is a schematic block diagram that provides one example illustration of a computing environment employed in the networked environment of FIG. 1 according to various embodiments of the present disclosure.

With reference to FIG. 10, shown is a schematic block diagram of the computing environment 203 according to an embodiment of the present disclosure. The computing environment 203 includes one or more computing devices. Each computing device includes at least one processor circuit, for example, having a processor 1003 and a memory 1006, both of which are coupled to a local interface 1009. To this end, each computing device environment 203 may comprise, for example, at least one server computer or like device. The local interface 1009 may comprise, for example, a data bus with an accompanying address/control bus or other bus structure as can be appreciated.

Stored in the memory 1006 are both data and several components that are executable by the processor 1003. In particular, stored in the memory 1006 and executable by the processor 1003 are the electronic commerce system 215, the developer application 218, the ADK service 221, the storage service 224, the queue services 227, and potentially other applications. Also stored in the memory 1006 may be a data store 212 and other data. In addition, an operating system may be stored in the memory 1006 and executable by the processor 1003.

It is understood that there may be other applications that are stored in the memory 1006 and are executable by the processor 1003 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 1006 and are executable by the processor 1003. In this respect, the term "executable" means a program file that is in a form that can ultimately be run by the processor 1003. Examples of executable programs may be, for example, a compiled program that can be translated into machine code in a format that can be loaded into a random access portion of the memory 1006 and run by the processor 1003, source code that may be expressed in proper format such as object code that is capable of being loaded into a random access portion of the memory 1006 and executed by the processor 1003, or source code that may be interpreted by another executable program to generate instructions in a random access portion of the memory 1006 to be executed by the processor 1003, etc. An executable program may be stored in any portion or component of the memory 1006 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1006 is defined herein as including both volatile and nonvolatile memory and data storage components. Volatile components are those that do not retain data values upon loss of power. Nonvolatile components are those that retain data upon a loss of power. Thus, the memory 1006 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1003 may represent multiple processors 1003 and/or multiple processor cores and the memory 1006 may represent multiple memories 1006 that operate in parallel processing circuits, respectively. In such a case, the local interface 1009 may be an appropriate network that facilitates communication between any two of the multiple processors 1003, between any processor 1003 and any of the memories 1006, or between any two of the memories 1006, etc. The local interface 1009 may comprise additional systems designed to coordinate this communication, including, for example, performing load balancing. The processor 1003 may be of electrical or of some other available construction.

Although the electronic commerce system 215, the developer application 218, the ADK service 221, the storage service 224, the queue services 227, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 8 and 9 show the functionality and operation of an implementation of portions of the ADK services 221. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1003 in a computer system or other system. The machine code may be converted from the source code, etc. If embodied in hardware, each block may represent a circuit or a number of interconnected circuits to implement the specified logical function(s).

Although the flowcharts of FIGS. 8 and 9 show a specific order of execution, it is understood that the order of execution may differ from that which is depicted. For example, the order of execution of two or more blocks may be scrambled relative to the order shown. Also, two or more blocks shown in succession in FIGS. 8 and 9 may be executed concurrently or with partial concurrence. Further, in some embodiments, one or more of the blocks shown in FIGS. 8 and 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce system 215, the developer application 218, the ADK service 221, the storage service 224, the queue services 227, that comprises software or code can be embodied in any non-transitory computer-readable medium for use by or in connection with an instruction execution system such as, for example, a processor 1003 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a first computing device, comprising:
   code that periodically receives, in the first computing device, a measurement policy and a transmission policy from a second computing device, wherein the measurement policy and the transmission policy are dynamically defined by an authorized user via a developer interface and transmitted from the second computing device to the first computing device upon a request made by the authorized user in the developer interface, and wherein the measurement policy and the transmission policy are associated with execution of the application;
   code that configures the first computing device to collect a plurality of measurements associated with the execution of the application in the first computing device, the plurality of measurements collected according to the measurement policy;
   code that stores the plurality of measurements locally on the first computing device according to the measurement policy;
   code that aggregates the plurality of measurements into at least one measurement collection; and code that makes a transmission of the at least one measurement collection over a network according to the transmission policy to present to the authorized user, the at least one measurement collection comprising information associated with the execution of the application on the first computing device.

2. The non-transitory computer-readable medium of claim 1, wherein the transmission of the at least one measurement collection is based at least in part on a network connection made between the first computing device and a network data service provider.

3. The non-transitory computer-readable medium of claim 1, wherein the transmission of the at least one measurement collection is based at least in part on a battery profile associated with a battery powering the first computing device.

4. The non-transitory computer-readable medium of claim 1, wherein the developer interface further comprises a developer portal comprising at least one user interface facilitating a definition of the measurement policy and the transmission policy in the user interface.

5. The non-transitory computer-readable medium of claim 1, wherein the developer interface further comprises an application programming interface (API) configured to receive a definition of the measurement policy and the transmission policy via at least one web service call initiated by the authorized user.

6. The non-transitory computer-readable medium of claim 1, further comprising:
   code that reconfigures the first computing device to collect the plurality of measurements according to an updated measurement policy; and
   code that transmits the plurality of measurements according to an updated transmission policy;
   wherein the updated measurement policy and the updated transmission policy are updated according to an update request made by the authorized user via a web service call.

7. A system, comprising:
   at least one computing device configured to communicate with at least one client device, the at least one computing device comprising an application executable on the at least one computing device, the application comprising:
   logic that accesses a measurement policy and a transmission policy from a data store, the measurement policy and the transmission policy defined by an authorized user via a developer interface and stored in the data store in response to a definition made by the authorized user via the developer interface;
   logic that makes a transmission of the measurement policy and the transmission policy to the at least one client device; and
   logic that receives, in response to the transmission, at least one measurement collected on the at least one client device, the at least one measurement collected on the at least one client device based at least in part on the measurement policy and transmitted by the at least one client device based at least in part on the transmission policy.

8. The system of claim 7, wherein the measurement policy and the transmission policy are transmitted to the at least one client device to configure the at least one client device to collect the at least one measurement in association with a client application.

9. The system of claim 7, the application further comprising logic that transmits the at least one measurement to a user device accessible to the authorized user in response to a request made by the authorized user.

10. The system of claim 7, the application further comprising logic that derives statistical information from the at least one measurement collected on the at least one client device.

11. The system of claim 8, the application further comprising:
   logic that transmits an updated measurement policy and an updated transmission policy to the at least one client device in response to an update request made by the authorized user via the developer interface, the at least one client device reconfigured according to the updated measurement policy and the updated transmission policy;
   logic that receives the at least one measurement collected on the at least one client device, the at least one measurement collected based at least in part on the updated measurement policy and transmitted by the at least one client device based at least in part on the updated transmission policy.

12. A method, comprising:
   receiving, by a client device, a measurement policy and a transmission policy via a web service executable on at least one computing device, the measurement policy and the transmission policy predefined by an authorized user via a developer interface in response to a request made by the authorized user via the developer interface;
   configuring, by the client device, a configuration file associated with an application capable of execution on the client device according to the measurement policy to collect at least one measurement in the client device, the at least one measurement associated with the execution of the application; and
   making, by the client device, a transmission of the at least one measurement over a network in accordance with the transmission policy.

13. The method of claim 12, further comprising:
   the at least one measurement comprising a plurality of measurements; and
   aggregating, by the client device, the plurality of measurements into at least one measurement collection.

14. The method of claim 13, further comprising transmitting, by the client device, the at least one measurement collection over the network based at least in part on the transmission policy.

15. The method of claim 13, further comprising storing, by the client device, the at least one measurement collection locally on the client device.

16. The method of claim 15, wherein the at least one measurement collection stored locally on the client device is stored according to the measurement policy.

17. The method of claim 15, wherein the at least one measurement collection stored locally on the client device is encrypted according to an encryption scheme defined in the measurement policy.

18. The method of claim 12, wherein the transmission of the at least one measurement is based at least in part on a network connection made between the at least one computing device and a network data service provider.

19. The method of claim 12, wherein the transmission of the at least one measurement is based at least in part on a battery profile associated with a battery powering the at least one computing device.

20. The method of claim 12, wherein the transmission of the at least one measurement is conducted by transmitting the at least one measurement to a plurality of computing devices, the plurality of computing devices in a distributed computing arrangement.

21. The method of claim 20, wherein at least one of the plurality of computing devices comprises a storage service executable on the at least one of the plurality of computing devices, the storage service configured to store the at least one measurement.

22. The method of claim 20, wherein at least one of the plurality of computing devices comprises a queue service executable on the at least one of the plurality of computing devices, the queue service configured to place the at least one measurement in a queue to await processing.

23. The method of claim 12, further comprising:
  receiving, by the client device, an updated measurement policy and an updated transmission policy in response to an update request made by the authorized user via the developer interface;
  reconfiguring the client device to collect the at least one measurement according to the updated measurement policy; and
  transmitting, by the client device, the at least one measurement according to the updated transmission policy.

* * * * *